M. B. STAFFORD.
Peat Machine.
No. 56,626.
Patented July 24, 1866.
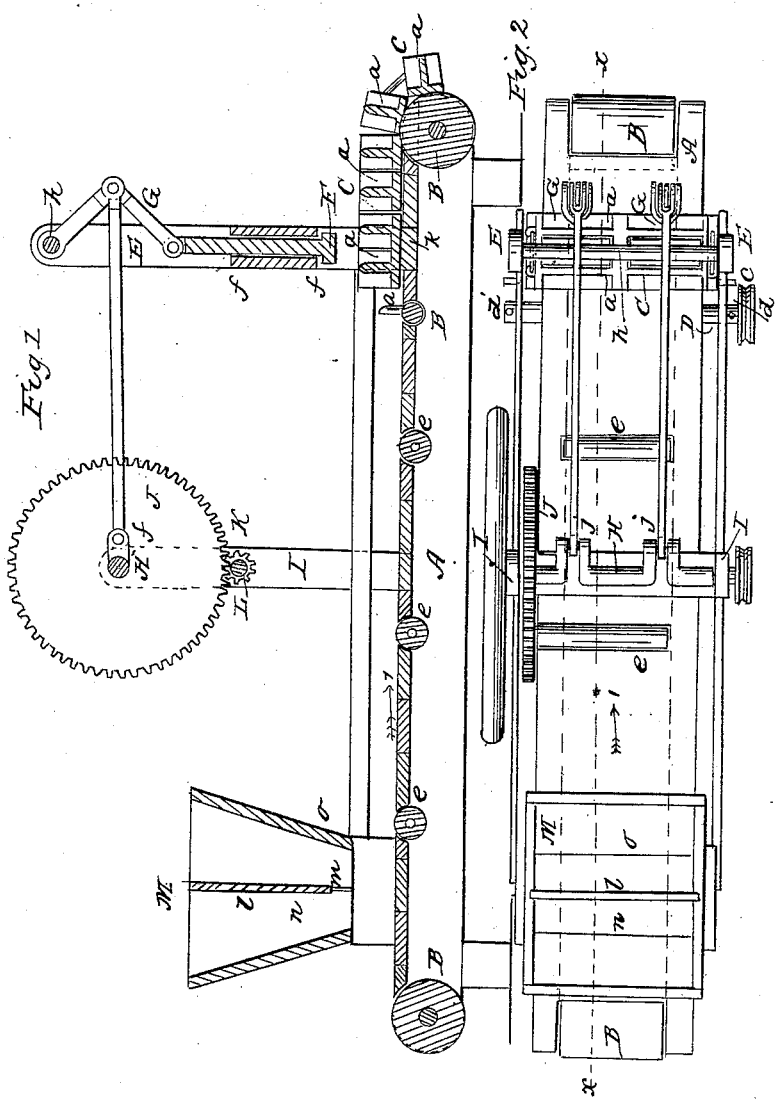
Witnesses
Inventor
M. B. Stafford
By Munn & Co
Attorneys

UNITED STATES PATENT OFFICE.

M. B. STAFFORD, OF NEW YORK, N. Y.

IMPROVED PEAT-MACHINE.

Specification forming part of Letters Patent No. 56,626, dated July 24, 1866.

*To all whom it may concern:*

Be it known that I, M. B. STAFFORD, of the city, county, and State of New York, have invented a new and Improved Machine for Pressing and Molding Peat and other Substances; and I do hereby declare that the following is a full, clear, and exact description thereof, which will enable others skilled in the art to make and use the same, reference being had to the accompanying drawings, forming a part of this specification, in which—

Figure 1 is a side sectional view of my invention taken in the line $x\,x$, Fig. 2; Fig. 2, a plan or top view of the same.

Similar letters of reference indicate like parts.

This invention relates to a new and improved machine for pressing and molding peat in an expeditious and perfect manner and by a continuous rotary motion of the driving-shaft.

A represents a framing, at each end of which there is a roller, B, for an endless band or chain of molds, C, to pass over. These molds are composed of two longitudinal halves, $a\,a$, connected by joints $b$, and arranged in such a manner that they will open in passing around the rollers B, as shown clearly in Fig. 1.

The molds are provided at their ends with horizontal projecting pins or teeth $c$, against which teeth $d$, on a transverse shaft, D, in the framing act and feed the molds along, the upper part of the endless chain of molds resting on rollers $e$, which serve to obviate friction.

The molds are of such a form as to give the peat or other substance to be molded a rectangular form.

E E are uprights secured to opposite sides of the framing A, and having guides $f$ attached to their inner sides, between which a plunger, F, works, the upper end of the plunger having the lower ends of toggles G G attached, the upper ends of the latter being attached to a shaft, $h$, between the upper ends of E E.

The toggles G G are connected, by rods $i\,i$, with cranks $j\,j'$ on a shaft, H, fitted between uprights I I, attached to opposite sides of the framing A, said shaft H having a spur-wheel, J, on one end of it, into which a pinion, K, gears, the latter being on the driving-shaft L of the machine.

The fixed shaft D may be operated by a belt from the crank-shaft H.

On the framing A, directly in line with the plunger F, there is a solid bearing, $k$, of metal or other solid or firm material.

M is a hopper placed on the framing A, and having one or more partitions, $l$, in it, the lower edges of which are provided with teeth $m$.

The peat is placed in the compartment $n$ of the hopper, and falls into the molds C as they pass underneath $n$, the teeth $m$ preventing sticks or other foreign substances from passing beyond $l$, and the surplus peat being scraped off by the lower edge of the inner side, $o$, of the hopper.

The endless chain of molds moves in the direction indicated by the arrow 1, and as they come over the bed or bearing $k$ and underneath the plunger F, the latter descends and compresses the peat or other substance within them, the molds remaining stationary while the plunger descends and moving forward while the plunger ascends, the feed mechanism being constructed or arranged with a view to that end.

The compressed substance is discharged from the molds, as the latter are opened in passing around the roller B, at the discharge end of the framing A. (See Fig. 1.)

The hopper M may be provided with more than one partition, $l$, if desired, and when more than one are used their lower toothed edges are placed at different heights, the teeth $m$ adjoining the compartment $n$ being the highest, and the others being each lower than the ones behind, so as to insure perfect work and prevent clogging and choking in the hopper.

Having thus described my invention, I claim as new and desire to secure by Letters Patent—

1. The constructing of the molds C of two longitudinal parts or halves connected by hinges, and so arranged as to form an endless chain of molds to work over rollers and receive the peat or other substance to be compressed, and to discharge the same after being compressed by passing over the roller at the discharge end of the framing, substantially as set forth.

2. The plunger F, operated as shown, in combination with the endless chain of molds, substantially as and for the purpose specified.

3. The hopper M, provided with one or more partitions, $l$, provided with teeth $m$ at their lower edges, in combination with the endless chain of molds C, substantially as and for the purpose set forth.

M. B. STAFFORD.

Witnesses:
  M. M. LIVINGSTON,
  CHAS. D. SMITH.